(12) United States Patent
Leland et al.

(10) Patent No.: US 8,297,058 B2
(45) Date of Patent: Oct. 30, 2012

(54) APPARATUS AND METHOD FOR PROCESSING AIRFLOW WITH FLOWFIELD MOLDED HYPERSONIC INLET

(75) Inventors: Bradley C. Leland, Burleson, TX (US); John D. Klinge, Fort Worth, TX (US); Brian F. Lundy, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 748 days.

(21) Appl. No.: 12/336,389

(22) Filed: Dec. 16, 2008

(65) Prior Publication Data

US 2009/0094987 A1 Apr. 16, 2009

Related U.S. Application Data

(62) Division of application No. 11/187,577, filed on Jul. 22, 2005, now Pat. No. 7,568,347.

(51) Int. Cl.
*F02K 7/10* (2006.01)
(52) U.S. Cl. .................. 60/768; 137/15.1; 244/53 B
(58) Field of Classification Search .............. 60/767, 60/768; 137/15.1, 15.2; 244/53 B; D12/319, D12/342, 343
See application file for complete search history.

(56) References Cited

U.S. PATENT DOCUMENTS

| | | | |
|---|---|---|---|
| 2,990,142 A * | 6/1961 | Ferri | 244/53 B |
| 3,280,565 A * | 10/1966 | Dugger et al. | 60/768 |
| 4,245,803 A | 1/1981 | DeBlois | |
| 4,372,505 A * | 2/1983 | Syberg | 244/53 B |
| 5,749,542 A | 5/1998 | Hamstra et al. | |
| 5,779,189 A | 7/1998 | Hamstra et al. | |

OTHER PUBLICATIONS

Sabean, John W., et al, Performance Study of a Power Law Starbody, Journal of Spacecraft and Rockets, 1999, pp. 646-652, vol. 36, No. 5.
Javaid, K. H., et al, Airframe-Propulsion Integration Methodology for Waverider-Derived Hypersonic Cruise Aircraft Design Concepts, Journal of Spacecraft and Rockets, 2005.
Sobieczky, H., et al, Hypersonic Waverrider Design from Given Shock Waves, First Int'l Waverider Symposium, 1990, University of Maryland.
Javaid, Kashif H., et al., Thrust-Matching Requirements for the Conceptual Design of Hypersonic Waverider Vehicles, Journal of Aircraft, 2005, pp. 1055-1064, vol. 42, No. 4.

\* cited by examiner

*Primary Examiner* — Ehud Gartenberg
*Assistant Examiner* — Lorne Meade
(74) *Attorney, Agent, or Firm* — Bracewell & Giuliani LLP

(57) ABSTRACT

A diverterless hypersonic inlet (DHI) for a high speed, airbreathing propulsion system reduces the ingested boundary layer flow, drag, and weight, and maintains a high capture area for hypersonic applications. The design enables high vehicle fineness ratios, low-observable features, and enhances ramjet operability limits. The DHI is optimized for a particular design flight Mach number. A forebody segment generates and focuses a system of multiple upstream shock waves at desired strengths and angles to facilitate required inlet and engine airflow conditions. The forebody contour diverts boundary layer flow to the inlet sides, effectively reducing the thickness of the boundary layer that is ingested by the inlet, while maintaining the capture area required by the hypersonic propulsion system. The cowl assembly is shaped to integrate with the forebody shock system and the thinned boundary layer region.

13 Claims, 8 Drawing Sheets

APPARATUS AND METHOD FOR PROCESSING AIRFLOW WITH FLOWFIELD MOLDED HYPERSONIC INLET

This is a divisional application of Ser. No. 11/187,577, which was filed on Jul. 22, 2005, now U.S. Pat. No. 7,568,347.

This patent application is subject to U.S. Air Force contract No. F33615-00-D-3053. The Government has certain rights in this invention.

BACKGROUND OF THE INVENTION

1. Technical Field

The present invention relates in general to air craft engines and, in particular, to an improved system, method, and apparatus for a diverterless hypersonic inlet for integrated turbojet and ram-scramjet aircraft jet engine applications.

2. Description of the Related Art

Boundary layer diverters using splitter plate and wedge geometries are traditionally employed to reduce or eliminate boundary layer thickness upstream from the inlets of air-breathing propulsion systems at Mach 1 to Mach 2+. The high drag and weight of such devices has been overcome in the past with more thrust (which required bigger engines), more engines, or the additional use of afterburners. These designs result in yet more weight, less vehicle payload capacity, higher fuel consumption, and/or other aircraft design penalties. Higher Mach number, multi-engine aircraft (Mach 2 to 3+) have employed efficient, axisymmetric spike inlets or underwing-mounted nacelles. However, these designs require large amounts of internal boundary layer bleed, add significant drag, and are structurally inefficient.

The development of the ramjet or scramjet powered hypersonic aircraft has been historically thwarted by inefficient inlet and forebody designs. An inefficient hypersonic forebody and inlet design can have poor transonic performance characteristics, which compromises the ability of an on-board gas turbine propulsion system to accelerate to ramjet transition speed without running out of fuel. An inefficient design can also allow ramjet ingestion of a thick boundary layer which delays ramjet startup until the vehicle achieves at least Mach 3.5. Gas turbine propulsion systems are historically inefficient beyond Mach 2.5, so afterburning, base burning, rocket assistance, releasing the vehicle from an aircraft at altitude, and combinations thereof are generally considered to fill the gap between Mach 2.5 and 3.5, and thereby achieve required ramjet start-up conditions. As such, the problems associated with hypersonic inlets (boundary layer flow, high transonic drag, etc.) have not been resolved to facilitate the practical use of efficient, self-powered, hypersonic airbreathing vehicles. An improved solution that addresses these limitations would be desirable.

SUMMARY OF THE INVENTION

One embodiment of a system, method, and apparatus for diverterless hypersonic inlets (DHI) offers solutions that incorporate favorable air flow characteristics for high speed (e.g., Mach 3+) air-breathing propulsion systems. The DHI shape thins the boundary layer for engines that traditionally operate above Mach 3, thereby allowing them to work at lower Mach numbers. The long and narrow shape of DHI designs also improves transonic drag, which is a common issue with traditionally-shaped (i.e., wide and flat) hypersonic vehicles. The DHI reduces the penalties associated with traditional boundary layer diversion techniques and enables vehicle operability well into the hypersonic flight regime.

The present invention is well suited for ramjet and/or scramjet engines. The DHI reduces the ingested boundary layer flow, reduces drag and weight associated with traditional boundary layer diverter configurations, maintains a high capture area for hypersonic applications, enables high vehicle fineness ratios (which lowers transonic drag), provides a practical basis for low-observable features, and enhances ramjet operability limits.

In one embodiment, the DHI comprises a cowl assembly mounted to a segmented, contoured forebody. The DHI is designed to fit vehicle size constraints and is optimized for specific flight Mach numbers. The forebody includes segments that generate and focus a system of multiple upstream shock waves at desired strengths and angles to facilitate required inlet and engine airflow conditions. The forebody contour diverts boundary layer flow to either side of the inlet, effectively reducing the thickness of the boundary layer that is ingested by the inlet, while maintaining the capture area required by a hypersonic propulsion system. The cowl assembly is shaped to integrate with the forebody shock system and the thinned boundary layer region. The outer mold line of the DHI enables the vehicle to maintain a high fineness ratio which is beneficial for transonic acceleration.

The DHI has been computationally proven for at least Mach 3 to Mach 10 applications, which is well above the nominal operating envelope of traditional boundary layer diverting systems. The DHI is highly effective in boundary layer reduction above Mach 3, which is important for ramjet and scramjet applications. The present invention facilitates successful engine start-up and enhanced operability and performance at much lower Mach numbers than those demonstrated in the prior art. A lower Mach number start speed for a ramjet system closes the gap between the maximum speed of a gas turbine accelerator and the minimum speed at which a ramjet can take over. This design enables a dual mode, air breathing vehicle to propel itself to hypersonic speeds from a standing start on the ground. The DHI utilizes an elegant design method that converges on an optimized solution with few iterations, minimizing computer time, and requiring relatively few man hours. It provides a uniform flowfield at the cowl plane and can be modified to include low-observable features.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
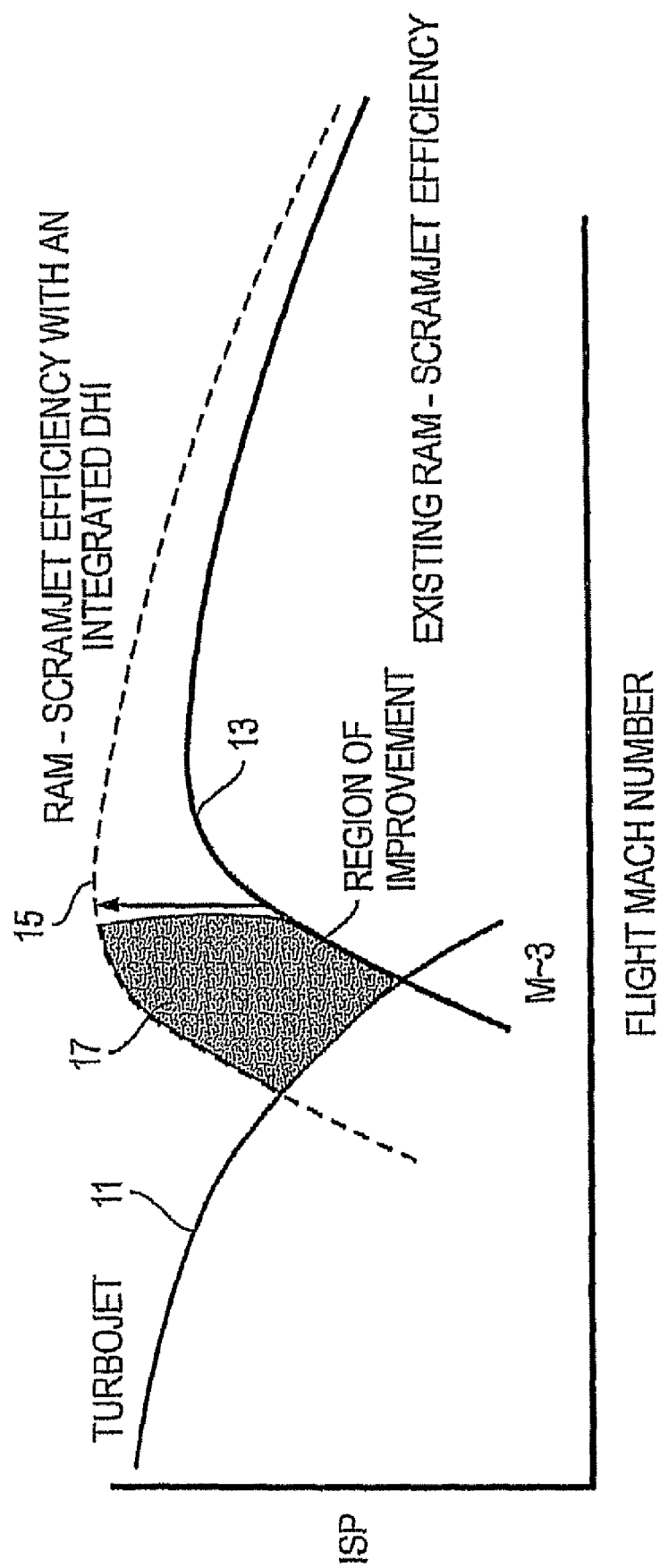
FIG. 1 is a plot of engine performance versus speed for turbojet, ramjet, and scramjet engines.

Referring to FIGS. 1-8, various embodiments of a system, method, and apparatus for a diverterless hypersonic inlet (DHI) constructed in accordance with the present invention are shown. As shown in FIG. 1, the performance 11 of aircraft with conventional turbojet engines deteriorates quickly as flight speed approaches Mach 3. Similarly, the performance 13 of conventionally configured ramjets and scramjets is also weak at flight speeds in the vicinity of Mach 3. However, a high speed aircraft configured with a DHI constructed in accordance with the present invention has a performance 15 with a significantly enhanced region of improvement 17 over conventional inlet designs. The turbojet, ramjet, and scramjet engine applications for the DHI of the present invention include flight speeds of approximately Mach 2.5 to 10.

Figure 2:
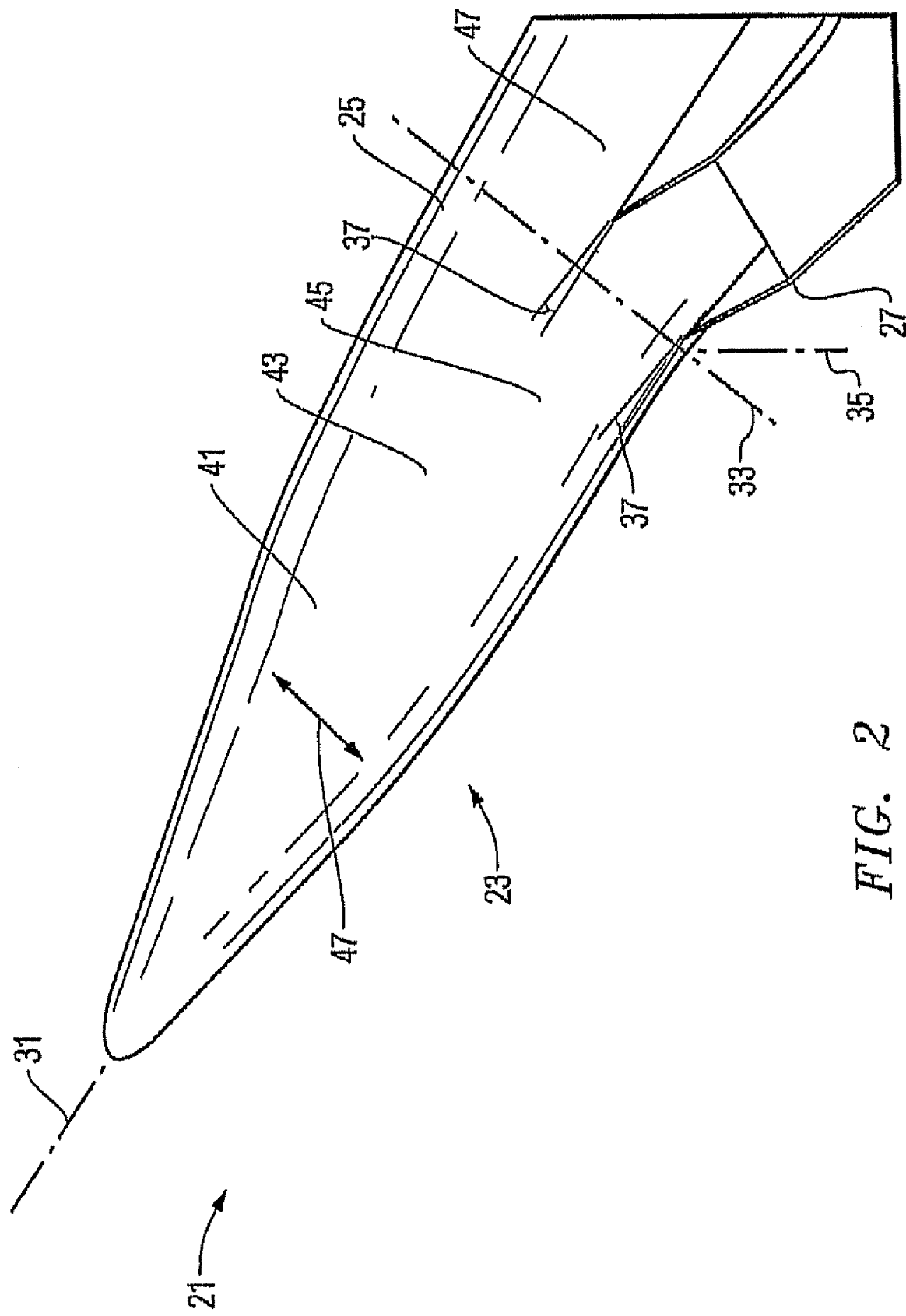
FIG. 2 is an isometric view of one embodiment of an aircraft having a diverterless hypersonic inlet (DHI) constructed in accordance with the present invention.
Figure 3:
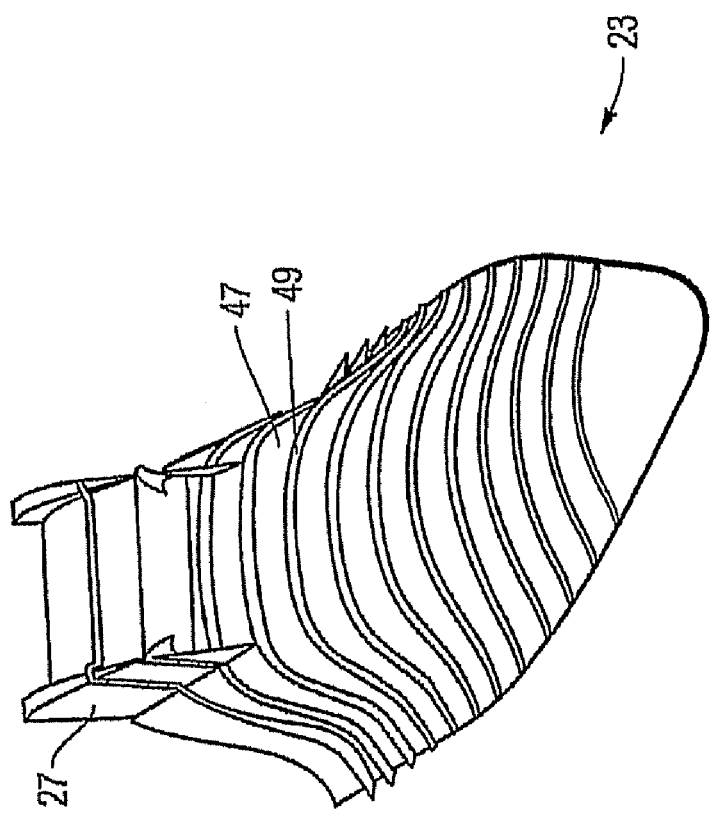
FIG. 3 is a front isometric view rendering comparing a DHI design augmented with and without boundary layer control.
Figure 3:
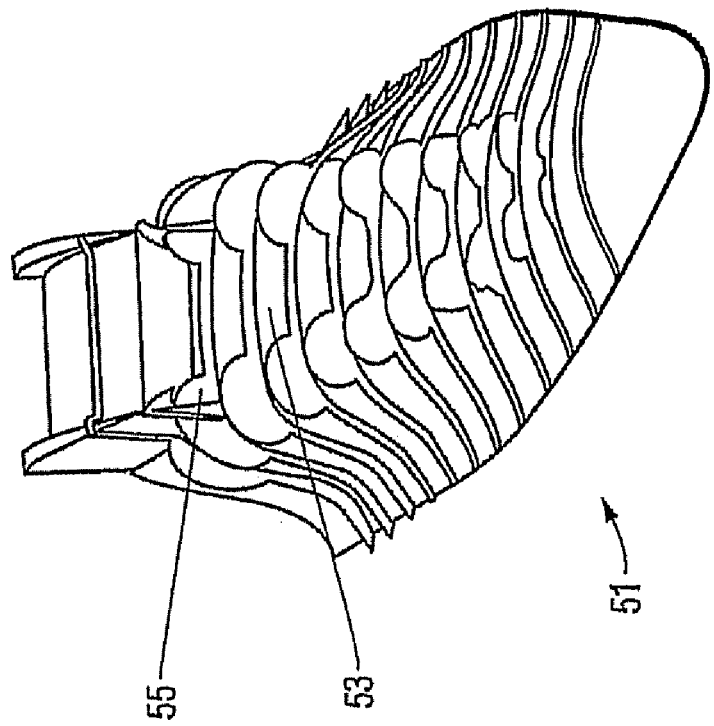
Figure 4:
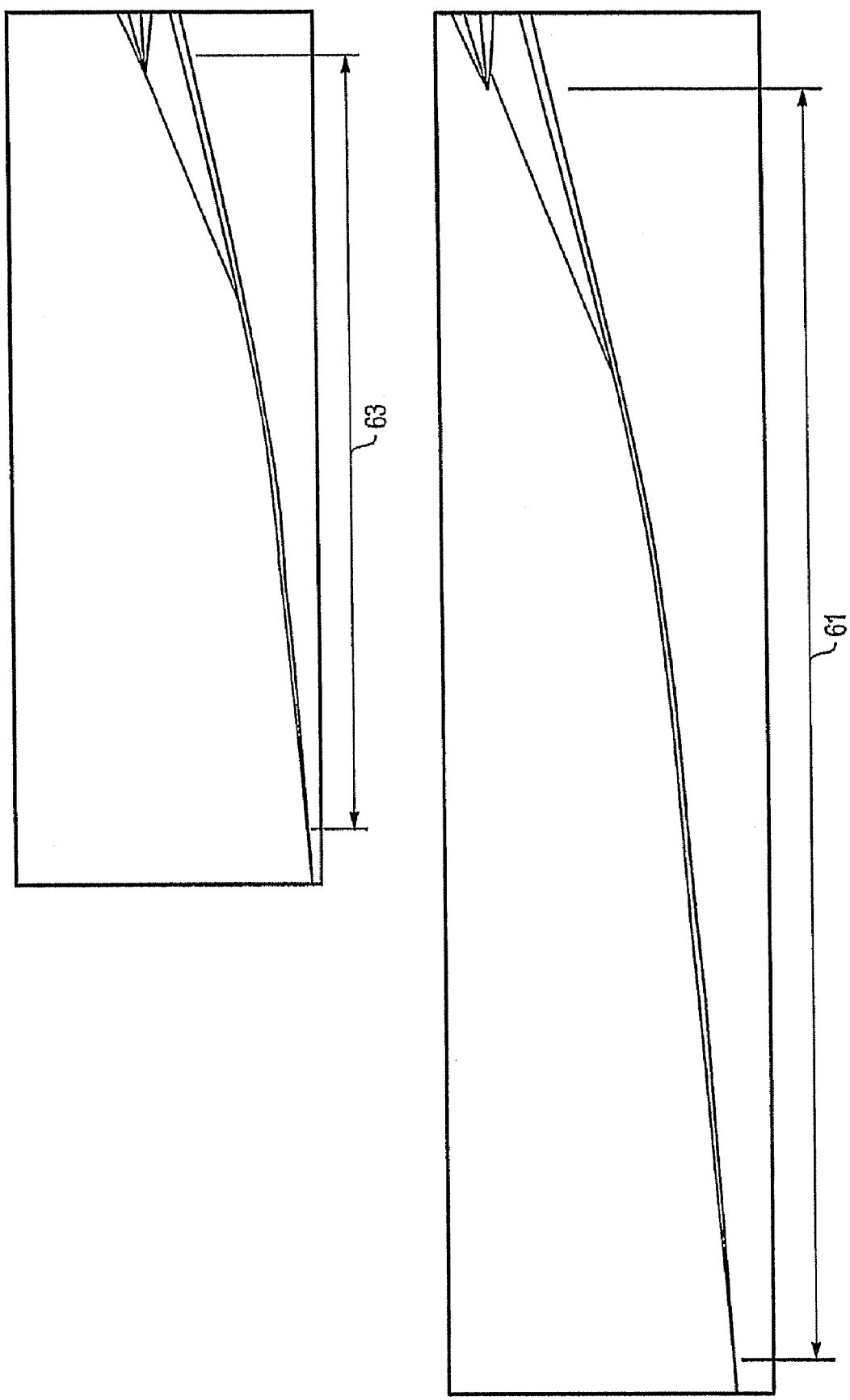
FIG. 4 is a side view rendering comparing boundary layer thickness for the DHI and a two-dimensional wedge-shaped inlet.

FIG. 2 illustrates an aircraft 21 with one embodiment of a DHI design 23 for processing hypersonic airflow. The DHI 23 extends along the forebody and incorporates the cowl 27 to define an intake manifold for the aircraft's engine. The forebody has a longitudinal axis 31 extending along a length of the aircraft 21, a lateral axis 33 orthogonal to the longitudinal axis 31, and a transverse axis 35 orthogonal to both the longitudinal and lateral axes 31, 33. In one embodiment, the DHI 23 also configures the forebody with a high outwash angle 37 (e.g., at least 3.9°) with respect to the longitudinal axis 31 for spilling the boundary layer airflow.

Figure 5:
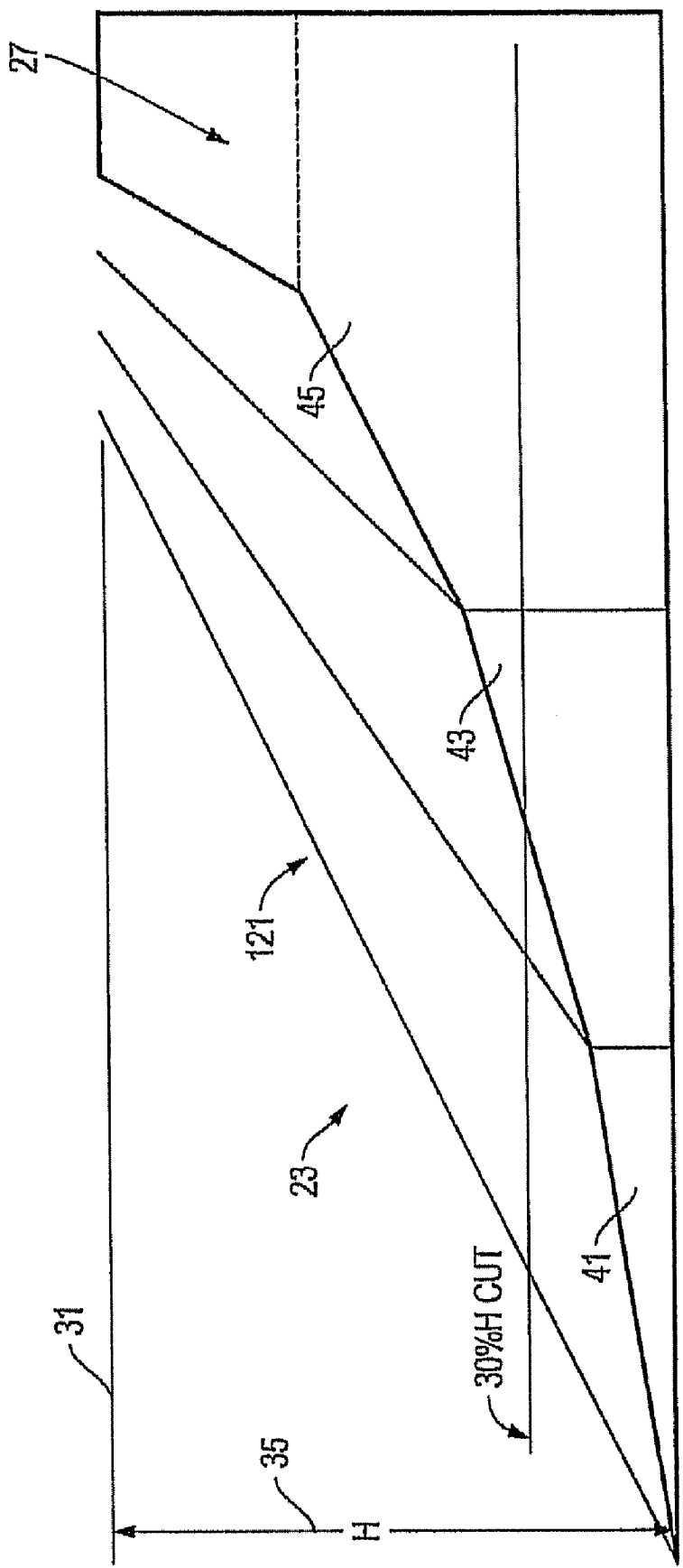
FIG. 5 is a side view rendering of the shock system for one embodiment of a DHI design constructed in accordance with the present invention.

As best shown in FIG. 5, the DHI 23 includes a plurality of ramp segments 41, 43, 45 (three shown) that are formed in a profile of the forebody extending along the longitudinal axis 31. Although the illustrated embodiment depicts three ramp segments 41, 43, 45, more or fewer segments may be utilized. Each of the ramp segments 41, 43, 45 are formed at angles with respect to the longitudinal and transverse axes 31, 35, such that the ramp segments 41, 43, 45 form a series of angles that sequentially increase in a downstream direction toward the cowl 27. As a result, the forebody of DHI 23 is significantly greater length 61 (lower half of FIG. 4) than the length 63 of a conventionally equipped inlet (upper half of FIG. 4). Even though the DHI is longer than conventionally equipped inlets, the boundary layer is proportionally thinner, as explained below.

Figure 6:
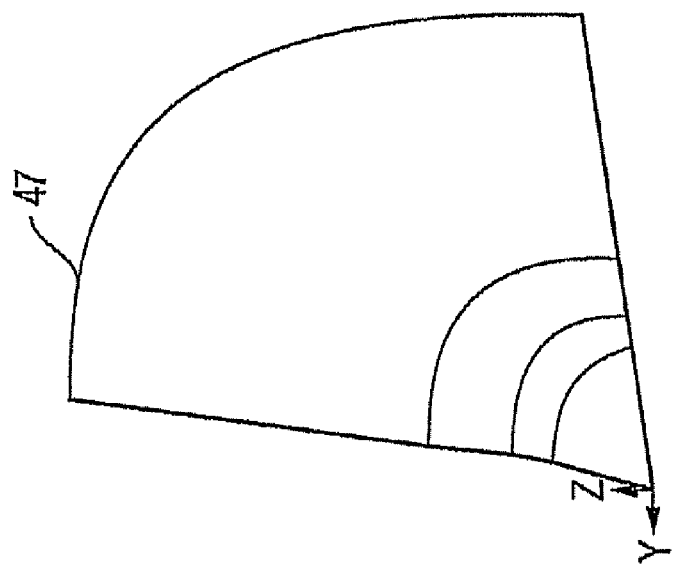
FIG. 6 illustrates isometric view renderings of a flowfield generator (FFG) spanwise contour for one embodiment of a DHI design constructed in accordance with the present invention.
Figure 6:
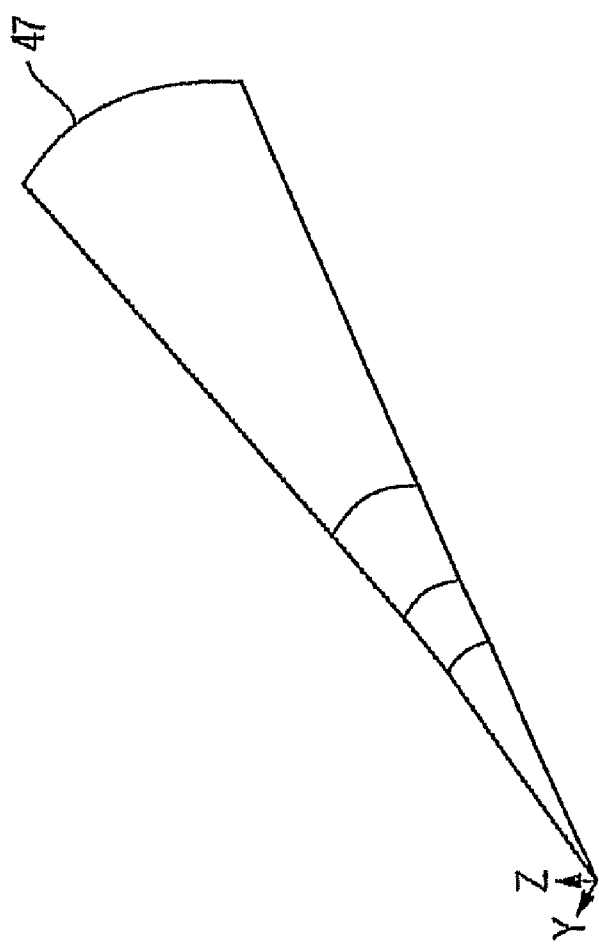
Figure 7:
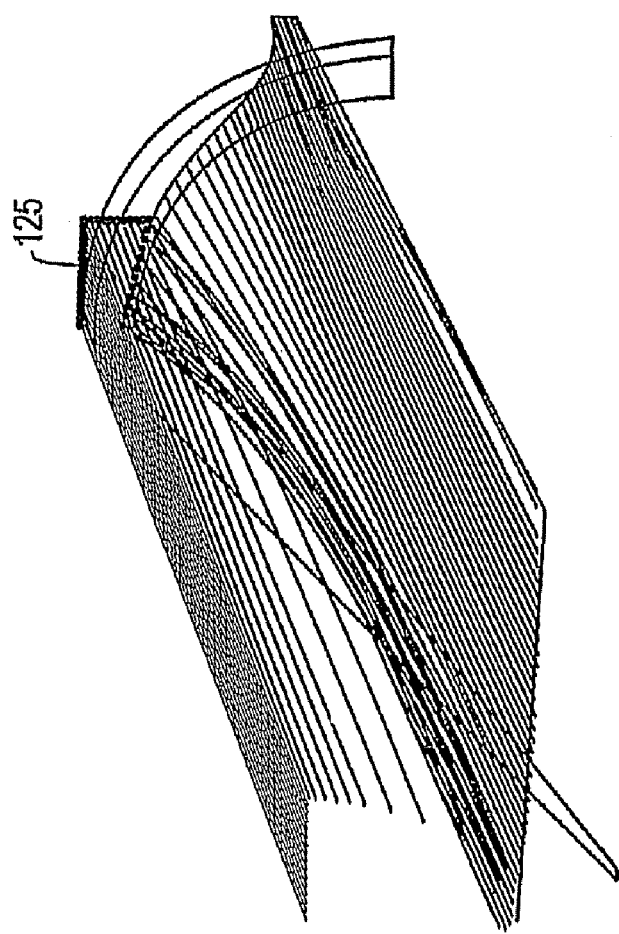
FIG. 7 illustrates isometric view renderings of the FFG of FIG. 6 with streamline seeds and planes for one embodiment of a DHI design constructed in accordance with the present invention.
Figure 7:
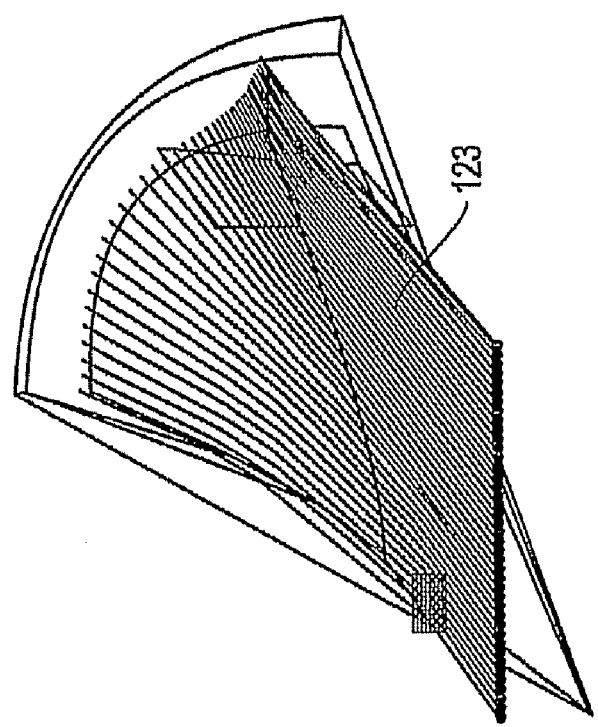

The DHI 23 also comprises spanwise contours 47 that are formed on the forebody adjacent each lateral side of the cowl 27. The spanwise contours 47 extend along both the longitudinal and lateral axes 31, 33. As best shown in FIG. 6, the spanwise contours 47 are designed to effectively divert and thin the boundary layer airflow for turbojet, ramjet, and scramjet engine applications. In contrast, an aircraft 51 with a conventional inlet 53 (top of FIG. 4) develops excessive boundary layer conditions 55 that degrade the performance 13 (see FIG. 1) of high speed aircraft engines. In one embodiment, the spanwise contours 47 are super elliptical as defined by the equation: $(x/a)^n + (y/b)^n = 1$, where $n > 2$ and a and b are the ellipse radii.

In addition, the DHI 23 enables the aircraft 21 to have a fineness ratio in excess of six (6). For purposes of the present invention, fineness ratio is defined as the length of the aircraft divided by the equivalent circular diameter of the maximum frontal cross-sectional area of the aircraft.

Figure 8:
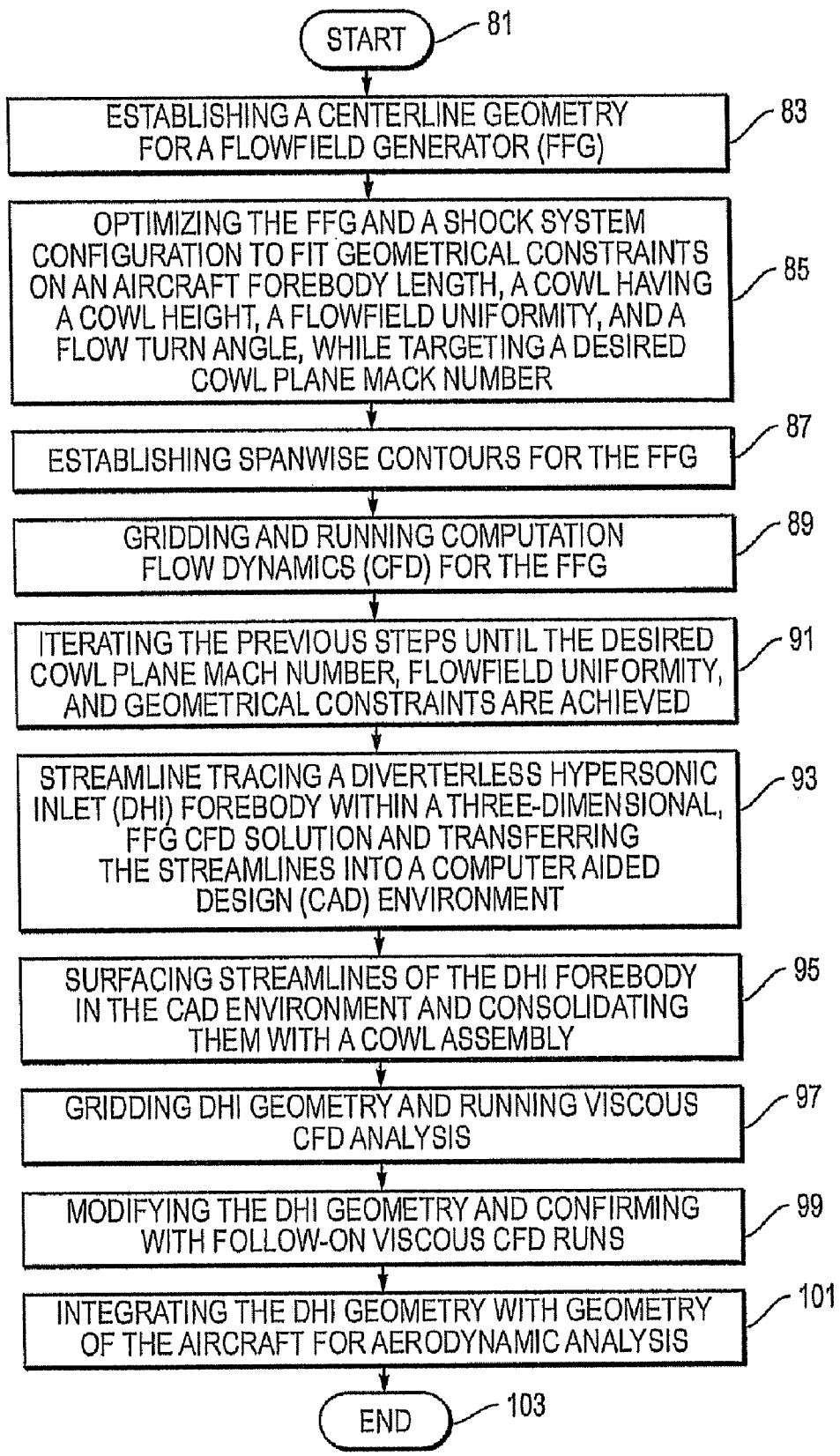
FIG. 8 is a high level flow diagram of one embodiment of a method constructed in accordance with the present invention.

Referring now to FIG. 8, the present invention also comprises a method of designing a hypersonic inlet for an aircraft. In one embodiment, the method begins as indicated at step 81, and comprises establishing a centerline geometry for a flowfield generator (FFG) (step 83); optimizing the FFG and a shock system 121 (FIG. 5) configuration to fit aircraft geometrical constraints and engine airflow requirements (step 85); establishing spanwise contours for the FFG (step 87); gridding and running computation fluid dynamics (CFD) for the FFG (step 89); and iterating steps (a) through (d) until the desired cowl plane Mach number, flowfield uniformity, and geometrical constraints are achieved (step 91).

In one embodiment, the method further comprises streamline tracing 123 (FIG. 7) a diverterless hypersonic inlet (DHI) forebody within a three-dimensional, FFG CFD solution and transferring the streamlines into a computer aided design (CAD) environment (step 93); surfacing streamlines of the DHI forebody in the CAD environment and consolidating them with a cowl assembly (step 95); gridding DHI geometry and running viscous CFD analysis (step 97); modifying the DHI geometry and confirming with follow-on viscous CFD runs (step 99); and then integrating the DHI geometry with geometry of the aircraft for aerodynamic analysis (step 101), before ending as indicated at step 103.

In step 83, the method also may comprise performing a series of inviscid conical and two-dimensional shock calculations to determine viable shock system configurations, including a plurality of shocks and shock angles, to achieve the desired cowl plane Mach number; and designing a segmented, cone-shaped FFG required to generate the desired shock system configuration. In step 85, the method may comprise factoring an intended streamline cut position of approximately 10% to 40% of the cowl height.

In step 87, the method may comprise contouring each spanwise contour individually, wherein each spanwise contour affects a spanwise shape of generated shocks, lateral boundary layer migration, and capture area of the cowl. In step 89, the method may comprise constructing streamline seed planes, superimposing construction planes to represent aircraft constraints and cowl geometry, assessing cowl plane flowfield uniformity and Mach number, assessing shock positions with respect to cowl geometry, and running streamlines forward from the cowl plane to assess a capture area thereof.

In addition, step 97 may comprise reassessing shock positions, cowl plane Mach number, and capture area, and assessing boundary layer thickness and surface pressure gradients; and step 99 may comprise evaluating off-design conditions and augmenting with DHI forebody flow control.

While the invention has been shown or described in only some of its forms, it should be apparent to those skilled in the art that it is not so limited, but is susceptible to various changes without departing from the scope of the invention.

What is claimed is:

1. A system for processing hypersonic airflow on a vehicle having an airbreathing propulsion system, comprising:
    a forebody that compresses the airflow with a plurality of longitudinal ramp segments that are blended to achieve a vehicle fineness ratio requirement and cross-sectional area distribution constraints,
    the ramp segments being contoured in the spanwise direction to divert boundary layer flow overboard, wherein the spanwise contours are super elliptical as defined by the equation:

$$(x/a)^n + (y/b)^n = 1$$

where n>2 and a and b are radii, and
    a cowl that captures the amount of airflow required by the airbreathing propulsion system at a station where uniform airflow characteristics exist.

2. A system according to claim 1, wherein the plurality of ramp segments are compression surfaces.

3. A system according to claim 1, wherein at least one of the ramp segments is contoured in both the longitudinal and spanwise directions.

4. A system according to claim 1, wherein the forebody has a longitudinal axis extending along the length of the vehicle, each of the ramp segments are formed at angles with respect to the vehicle longitudinal axis, and the ramp segments form a series of angles that sequentially increase in a downstream direction toward the cowl.

5. A system according to claim 1, wherein the airbreathing propulsion system includes speeds of approximately Mach 2.5 to Mach 10.

6. A system according to claim 1, wherein the vehicle has a vehicle fineness ratio in excess of six, wherein fineness ratio is defined as a length of the aircraft divided by an equivalent circular diameter of the maximum cross-sectional area of the vehicle and wherein the calculation of the vehicle fineness ratio includes a length of the forebody and a cross-sectional area of each of the forebody and the cowl.

7. The system of claim 1 wherein the airbreathing propulsion system is a scramjet engine.

8. A system for processing hypersonic airflow on a vehicle having an airbreathing propulsion system, comprising:
    a forebody having a longitudinal axis extending along a length of the vehicle and a first surface extending the length of the forebody and comprising a plurality of longitudinal ramp segments, wherein the longitudinal ramp segments
    are blended to form a generally smooth surface,
    are formed at angles with respect to the vehicle longitudinal axis to form a series of angles that sequentially increase in a downstream direction toward the cowl,
    extend to cover the entire first surface of the forebody,
    are contoured in the spanwise direction to divert boundary layer flow overboard, wherein the spanwise contours are super elliptical as defined by the equation:

$$(x/a)^n + (y/b)^n = 1$$

where n>2 and a and b are radii, and
    the cowl captures an amount of uniform airflow sufficient to operate the airbreathing propulsion system.

9. A system according to claim 8, wherein the plurality of ramp segments are compression surfaces.

10. A system according to claim 8, wherein at least one of the ramp segments is contoured in both the longitudinal and spanwise directions.

11. A system according to claim 8, wherein the airbreathing propulsion system includes speeds of approximately Mach 2.5 to Mach 10.

12. A system according to claim 8, wherein the vehicle has a vehicle fineness ratio in excess of six, wherein fineness ratio is defined as a length of the aircraft divided by an equivalent circular diameter of the maximum cross-sectional area of the vehicle and wherein the calculation of the vehicle fineness ratio includes a length of the forebody and a cross-sectional area of each of the forebody and the cowl.

13. The system according to claim 8, wherein the airbreathing propulsion system comprises a turbojet engine and a ramjet engine, and
    the longitudinal ramp segments create a vehicle fineness ratio and cross-section area distribution that permit the ramjet to operate near the maximum speed of a turbojet engine.

* * * * *